United States Patent
Goncalves et al.

(10) Patent No.: US 10,086,871 B2
(45) Date of Patent: Oct. 2, 2018

(54) VEHICLE DATA RECORDING

(71) Applicant: GM GLOBAL TECHNOLOGY OPERATIONS LLC, Detroit, MI (US)

(72) Inventors: Luis M. Goncalves, Farmington Hills, MI (US); Brunno L. Moretti, Walled Lake, MI (US); Esther Anderson, Canton, MI (US); Angelica J. Minissale, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 111 days.

(21) Appl. No.: 14/957,356

(22) Filed: Dec. 2, 2015

(65) Prior Publication Data

US 2017/0158235 A1  Jun. 8, 2017

(51) Int. Cl.
*B62D 15/02* (2006.01)
*B60R 1/00* (2006.01)
*G07C 5/08* (2006.01)

(52) U.S. Cl.
CPC .............. *B62D 15/021* (2013.01); *B60R 1/00* (2013.01); *B62D 15/025* (2013.01); *G07C 5/0866* (2013.01); *B60R 2300/105* (2013.01); *B60R 2300/8006* (2013.01)

(58) Field of Classification Search
USPC .......................................................... 701/41
See application file for complete search history.

(56) References Cited

U.S. PATENT DOCUMENTS

| | | | | |
|---|---|---|---|---|
| 2004/0239141 | A1* | 12/2004 | Iwao | B60J 1/20 296/84.1 |
| 2006/0167602 | A1* | 7/2006 | Matsumoto | B60Q 1/1423 701/36 |
| 2009/0041300 | A1* | 2/2009 | Mack | B60Q 1/085 382/103 |
| 2010/0332127 | A1* | 12/2010 | Imai | B60W 30/12 701/532 |
| 2013/0033566 | A1* | 2/2013 | Sento | G03B 37/02 348/36 |
| 2013/0066549 | A1* | 3/2013 | Wu | G01C 21/3658 701/425 |
| 2015/0032457 | A1* | 1/2015 | Koo | G06F 3/165 704/275 |
| 2016/0101729 | A1* | 4/2016 | Burke | G01S 13/931 701/36 |
| 2016/0216128 | A1* | 7/2016 | Takano | B60R 1/00 |
| 2016/0227098 | A1* | 8/2016 | Yasuhara | B60R 1/00 |

* cited by examiner

*Primary Examiner* — Jean Paul Cass
(74) *Attorney, Agent, or Firm* — Lorenz & Kopf, LLP

(57) ABSTRACT

Methods, systems, and vehicles are provided for recording vehicle data. In accordance with one embodiment, a vehicle comprises a wheel, a plurality of cameras, and a processor. The plurality of cameras and the processor are disposed onboard the vehicle. The processor is configured to at least facilitate determining whether the vehicle is engaging in a turn, and providing instructions for the plurality of cameras to automatically record a view of the wheel when it is determined that the vehicle is engaging in the turn.

13 Claims, 4 Drawing Sheets

VEHICLE DATA RECORDING

TECHNICAL FIELD

The present disclosure generally relates to vehicles, and more particularly relates to methods and systems for recording of vehicle data.

BACKGROUND

Certain vehicles today have recording devices that record vehicle data. However, it may be desirable to provide improved recording of vehicle data, for example for performance vehicles.

Accordingly, it is desirable to provide techniques for improved recording vehicle data, for example for performance vehicles. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises determining whether a vehicle is engaging in a turn via a processor onboard the vehicle, and automatically recording a view of a wheel of the vehicle, from a camera onboard the vehicle, via instructions provided via the processor when it is determined that the vehicle is engaging in the turn.

In accordance with another exemplary embodiment, a system is provided. The system comprises a plurality of cameras, a display screen, and a processor. The plurality of cameras, the display screen, and the processor are each disposed onboard the vehicle. The processor is configured to at least facilitate obtaining images from each of the plurality of cameras, generating a plurality of video images from the images obtained from the plurality of cameras, each video image corresponding to a different view corresponding to a different location of the vehicle, and providing instructions for the display of the plurality of video images within the vehicle via the display screen.

In accordance with a further exemplary embodiment, a vehicle is provided. The vehicle comprises a wheel, a plurality of cameras, and a processor. The plurality of cameras and the processor are disposed onboard the vehicle. The processor is configured to at least facilitate determining whether the vehicle is engaging in a turn, and providing instructions for the plurality of cameras to automatically record a view of the wheel when it is determined that the vehicle is engaging in the turn.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
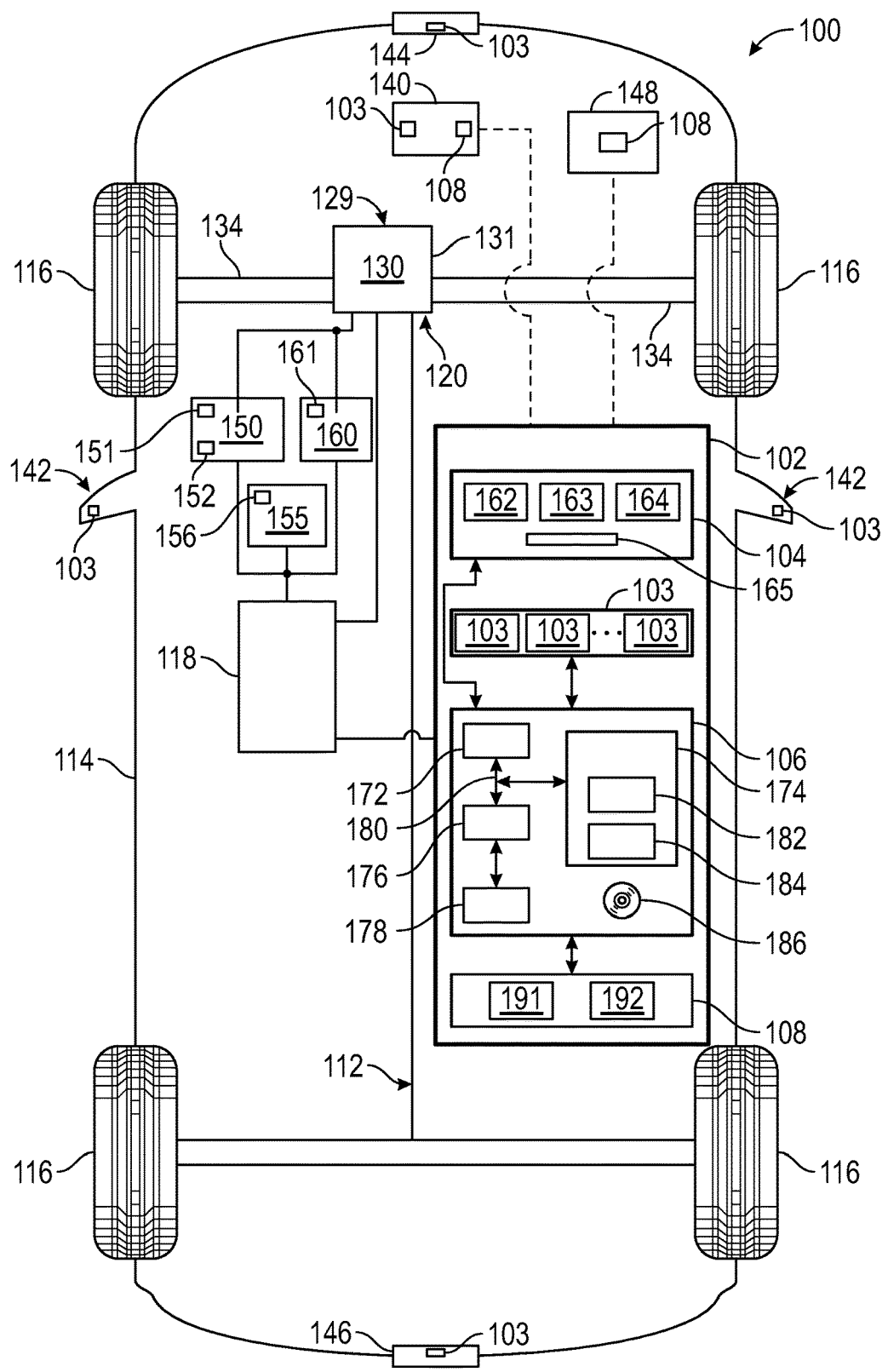
FIG. 1 is a functional block diagram of a vehicle that includes a system for recording vehicle data, in accordance with an exemplary embodiment.

FIG. 1 illustrates a vehicle 100, or automobile, according to an exemplary embodiment. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). In one embodiment, this vehicle 100 comprises a performance vehicle (e.g. as used for commercially and/or recreational racing and/or other performance driving); however, this may vary in other embodiments.

As described in greater detail further below, the vehicle 100 includes a control system 102 for providing vehicle data for a user. As discussed further below, the control system 102 includes a plurality of cameras 103, a sensor array 104, a controller 106, and a display unit 108. In various embodiments, the control system 102 provides recordings of views (including video images) from various different views associated with the vehicle 100, including a view of one or more of the wheels 116 as the vehicle 100 is performing a turn, as forth in greater detail further below in connection with the discussion of FIGS. 2-4.

In one embodiment depicted in FIG. 1, vehicle 100 includes, in addition to the above-referenced control system 102, a chassis 112, a body 114, four wheels 116, an electronic system 118, a powertrain 129, a rear view mirror 140, side mirrors 142, a front grill 144, a rear region (e.g. trunk) 146, an infotainment system 148 (e.g. radio, video, navigation, and/or other system providing information and/or entertainment for a user of the vehicle 100) a steering system 150, a braking system 155, and one or more other driver input systems 160. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114. As depicted in FIG. 1, each wheel 116 comprises a wheel assembly that includes a tire as well as a wheel and related components (and that are collectively referred to as the "wheel 116" for the purposes of this Application). In various embodiments the vehicle 100 may differ from that depicted in FIG. 1. For example, in certain embodiments the number of wheels 116 may vary. By way of additional example, in various embodiments the vehicle 100 may not have a steering system, and for example may be steered by differential braking, among various other possible differences.

In the exemplary embodiment illustrated in FIG. 1, the powertrain 129 includes an actuator assembly 120 that includes an engine 130. In various other embodiments, the powertrain 129 may vary from that depicted in FIG. 1 and/or described below (e.g. in some embodiments the powertrain may include a gas combustion engine 130, while in other embodiments the powertrain 129 may include an electric motor, alone or in combination with one or more other powertrain 129 components, for example for electric vehicles, hybrid vehicles, and the like). In one embodiment depicted in FIG. 1, the actuator assembly 120 and the powertrain 129 are mounted on the chassis 112 that drives the wheels 116. In one embodiment, the engine 130 comprises a combustion engine, and is housed in an engine mounting apparatus 131. In various other embodiments, the engine 130 may comprise an electric motor and/or one or more other transmission system 129 components (e.g. for an electric vehicle).

It will be appreciated that in other embodiments, the actuator assembly 120 may include one or more other types of engines and/or motors, such as an electric motor/generator, instead of or in addition to the combustion engine. In certain embodiments, the electronic system 118 comprises an engine system that controls the engine 130 and/or one or more other systems of the vehicle 100.

Still referring to FIG. 1, in one embodiment, the engine 130 is coupled to at least some of the wheels 116 through one or more drive shafts 134. In some embodiments, the engine 130 is mechanically coupled to the transmission. In other embodiments, the engine 130 may instead be coupled to a generator used to power an electric motor that is mechanically coupled to the transmission. In certain other embodiments (e.g. electrical vehicles), an engine and/or transmission may not be necessary.

The steering system 150 is mounted on the chassis 112, and controls steering of the wheels 116. In the depicted embodiment, the steering system 150 includes a steering wheel 151 and a steering column 152. In various embodiments, the steering wheel 151 receives inputs from a driver of the vehicle 100, and the steering column 152 results in desired steering angles for the wheels 116 via the drive shafts 134 based on the inputs from the driver. In certain embodiments, an autonomous vehicle may utilize steering commands that are generated by a computer, with no involvement from the driver.

The braking system 155 is mounted on the chassis 112, and provides braking for the vehicle 100. The braking system 155 receives inputs from the driver via a brake pedal 156, and provides appropriate braking via brake units (not depicted).

Other driver input systems 160 may include an acceleration input system comprising an accelerator pedal 161 that is engaged by a driver, with the engagement representative of a desired speed or acceleration of the vehicle 100. The other driver input systems 160 may also include, among other possible systems, various other inputs for various vehicle devices and/or systems, such as for the infotainment system 148, and/or one or more environmental systems, lighting units, and the like (not depicted). Similar to the discussion above regarding possible variations for the vehicle 100, in certain embodiments steering, braking, suspension, acceleration, and/or other driving features can be commanded by a computer instead of by a driver.

In one embodiment, the control system 102 is mounted on the chassis 112. As discussed above, the control system 102 provides recordings of video images from various different views associated with the vehicle 100, including a view of one or more of the wheels 116 as the vehicle 100 is performing a turn, as forth in greater detail further below in connection with the discussion of FIGS. 2-4.

As noted above and depicted in FIG. 1, in one embodiment the control system 102 comprises a plurality of cameras 103, a sensor array 104, a controller 106, and a display unit 108. The plurality of cameras 103 provide images with respect to various different locations of the vehicle 100. As depicted in one embodiment, cameras 103 are included within or proximate each of the rear view mirror 140, side mirrors 142, front grill 144, and rear region (e.g. trunk) 146. In one embodiment, the cameras 103 comprise video cameras controlled via the controller 106. In various embodiments, the cameras 103 may also be disposed in or proximate one or more other locations of the vehicle 100.

The sensor array 104 includes various sensors (also referred to herein as sensor units) that are used for providing measurements and/or data for use by the controller 106. In various embodiments, the sensors of the sensor array 104 comprise one or more inertial measurement units 162, steering angle sensors 163, global positioning system (GPS) devices 164, and/or wheel speed sensors 165. In one embodiment, the inertial measurement units 162 provide inertial measurement values for the vehicle 100. Also in one embodiment, the steering angle sensors 163 are coupled to the steering wheel 151 and/or to the steering column 152, and provide measurements corresponding to a steering angle of the steering wheel 151. In addition, in one embodiment, the GPS units provide location data pertaining to the vehicle 100, for example via communication with one or more satellites (not depicted). Also in one embodiment, the wheel speed sensors 165 measure movement and/or speed of one or more wheels 116 of the vehicle 100, for example for use in calculating a speed for the vehicle 100. In various embodiments, the sensor array 104 provides the measured information to the controller 106 for processing, including for determining whether the vehicle 100 is entering a turn, and for controlling the recorded views (including video images) accordingly, in accordance with the steps of the process 300 of FIG. 3.

The controller 106 is coupled to the sensor array 104 and to the display unit 108. The controller 106 utilizes the various measurements and information from the cameras 103 and the sensor array 104, and controls and provides recorded images (including video images) and data from the cameras, including based at least in part on whether the vehicle 100 is entering a turn. In various embodiments, the controller 106, along with the cameras 103, the sensor array 104, and the display unit 108, provide these and other functions in accordance with the steps discussed further below in connection with the process 300 of FIG. 3.

As depicted in FIG. 1, the controller 106 comprises a computer system. In certain embodiments, the controller 106 may also include one or more of the sensors of the sensor array 104, one or more other devices and/or systems, and/or components thereof. In addition, it will be appreciated that the controller 106 may otherwise differ from the embodiment depicted in FIG. 1. For example, the controller 106 may be coupled to or may otherwise utilize one or more remote computer systems and/or other systems, such as the electronic system 118, the infotainment system 148 of the vehicle 100, and/or one or more other systems of the vehicle 100.

In the depicted embodiment, the computer system of the controller 106 includes a processor 172, a memory 174, an interface 176, a storage device 178, and a bus 180. The processor 172 performs the computation and control functions of the controller 106, and may comprise any type of processor or multiple processors, single integrated circuits such as a microprocessor, or any suitable number of integrated circuit devices and/or circuit boards working in cooperation to accomplish the functions of a processing unit.

During operation, the processor 172 executes one or more programs 182 contained within the memory 174 and, as such, controls the general operation of the controller 106 and the computer system of the controller 106, generally in executing the processes described herein, such as the process 300 described further below in connection with FIG. 3.

The memory 174 can be any type of suitable memory. For example, the memory 174 may include various types of dynamic random access memory (DRAM) such as SDRAM, the various types of static RAM (SRAM), and the various types of non-volatile memory (PROM, EPROM, and flash). In certain examples, the memory 174 is located on and/or co-located on the same computer chip as the processor 172. In the depicted embodiment, the memory 174 stores the above-referenced program 182 along with one or more stored values 184.

The bus 180 serves to transmit programs, data, status and other information or signals between the various components of the computer system of the controller 106. The interface 176 allows communication to the computer system of the controller 106, for example from a system driver and/or another computer system, and can be implemented using any suitable method and apparatus. In one embodiment, the interface 176 obtains the various data from the sensors of the sensor array 104. The interface 176 can include one or more network interfaces to communicate with other systems or components. The interface 176 may also include one or more network interfaces to communicate with technicians, and/or one or more storage interfaces to connect to storage apparatuses, such as the storage device 178.

The storage device 178 can be any suitable type of storage apparatus, including direct access storage devices such as hard disk drives, flash systems, floppy disk drives and optical disk drives. In one exemplary embodiment, the storage device 178 comprises a program product from which memory 174 can receive a program 182 that executes one or more embodiments of one or more processes of the present disclosure, such as the steps of the process 300 (and any sub-processes thereof) described further below in connection with FIG. 3. In another exemplary embodiment, the program product may be directly stored in and/or otherwise accessed by the memory 174 and/or a disk (e.g., disk 186), such as that referenced below.

The bus 180 can be any suitable physical or logical means of connecting computer systems and components. This includes, but is not limited to, direct hard-wired connections, fiber optics, infrared and wireless bus technologies. During operation, the program 182 is stored in the memory 174 and executed by the processor 172.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 172) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 106 may also otherwise differ from the embodiment depicted in FIG. 1, for example in that the computer system of the controller 106 may be coupled to or may otherwise utilize one or more remote computer systems and/or other systems.

The display unit 108 is coupled to the controller 106, and provides recorded video images and data for a user in accordance with instructions provided via the control system 102 (and specifically, via the processor 172 thereof). As depicted in FIG. 1, in one embodiment, the display is integrated as part of the rear view mirror 140 and/or infotainment system 148 in various embodiments. However, this may vary in other embodiments. Also as depicted in FIG. 1, in one embodiment, the display unit 108 comprises a display screen 191 and a download device 192. In one embodiment, the display screen 191 provides a visual display of recorded video images and data from the cameras 103, via instructions provided by the processor 172, for viewing by a user within the vehicle 100. In addition, in one embodiment, the download device 192 allows a user within the vehicle 100 to download recorded video images and data from the cameras 103, via instructions provided by the processor 172, for example for viewing by a user on his or own computer, phone, and/or other personal electronic device.

Figure 2:
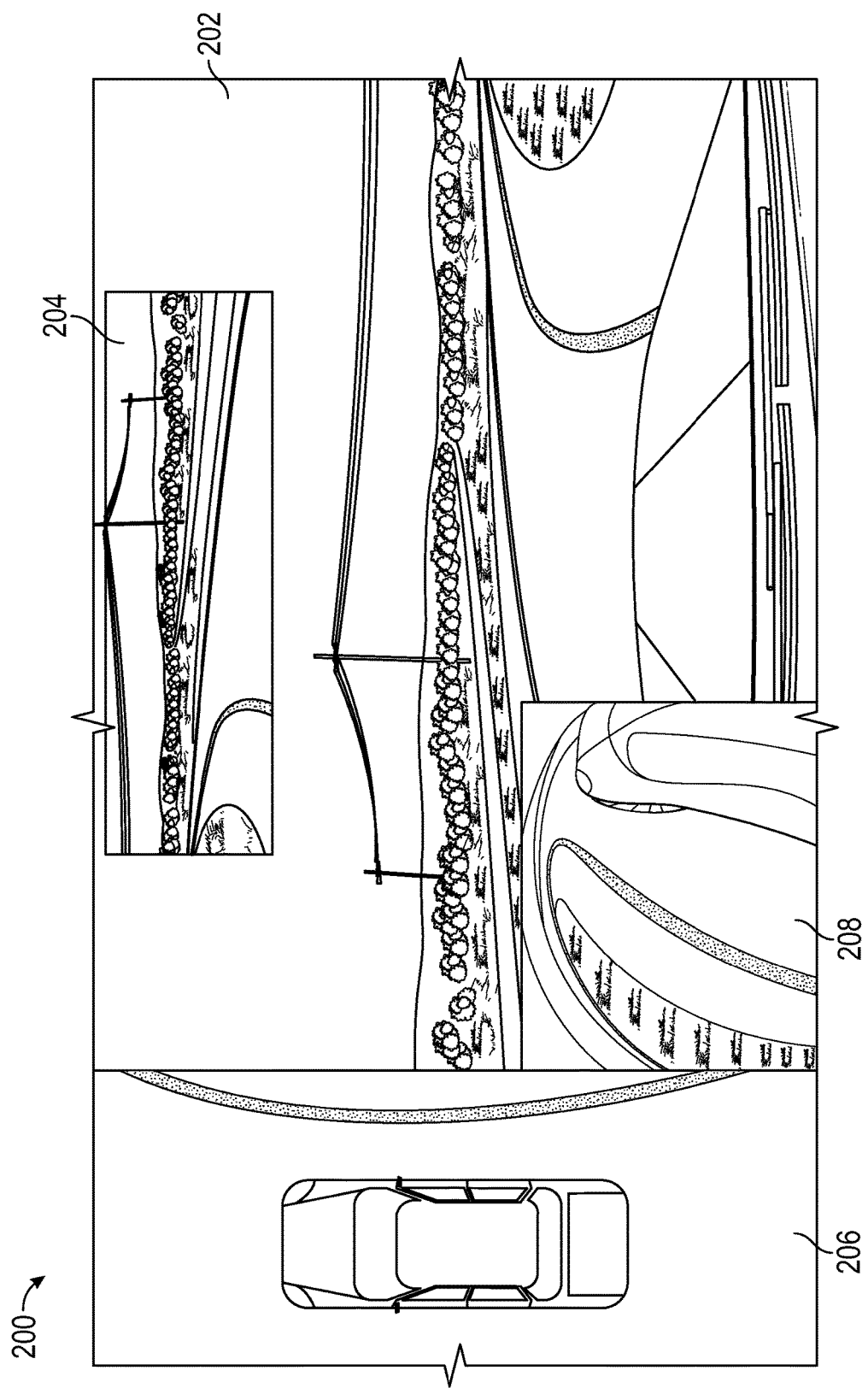
FIG. 2 is a presentation of a an exemplary display that can be provided using a vehicle system, and that can be implemented in connection with the system of FIG. 1, in accordance with an exemplary embodiment.

With reference to FIG. 2, a presentation is provided of an exemplary display 200 for a presentation that may be provided via the display unit 108 (e.g. for viewing within the vehicle 100 via the display screen 191 and/or downloaded via the download device 190). As shown in FIG. 2, the exemplary display 200 includes a front view 202, a rear view 204, a top down view 206, and a side view 208. The various views of the display 200 are described directly below in connection with FIG. 2 as well as additionally further below in connection with the process 300 of FIG. 3.

The front view 202 represents a view directly in front of the vehicle 100. In one embodiment, the front view 202 is generated via the processor 172 of FIG. 2 using images obtained from one or more cameras 103 disposed on or proximate the front grill 144 and/or rear view mirror 140 of FIG. 1.

The rear view 204 represents a view directly in back of the vehicle 100. In one embodiment, the rear view 204 is generated via the processor 172 of FIG. 2 using images obtained from one or more cameras 103 disposed on or proximate the rear region (e.g. trunk) 146 of FIG. 1.

The top down view 206 represents a view from directly above (or on top of) the vehicle 100, facing downward. In one embodiment, the top down view 206 is generated via the processor 172 of FIG. 2 using a compilation of images from each of the cameras 103 of the vehicle 100. Specifically, in one embodiment, raw images (e.g. video feed) from each wide field of view camera are sent to the processing unit (e.g. processor 172 of FIG. 1), which in turn de-warps each of the images, stitches all four images together, and creates the final top-down image. For example, with reference to FIG. 4, in one embodiment a front camera image 401 (from a camera at the front of the vehicle, such as a front facing camera proximate the rear view mirror 140 and/or front grille 144), a left camera image 402 (from a camera on a driver's side of the vehicle, such as on a driver's side mirror 142 of the vehicle), a right camera image 403 (from a camera on a passenger's side of the vehicle, such as on a passenger's side mirror 142 of the vehicle), and a rear camera image 404

(from a camera at the rear of the vehicle) are de-warped and stitched together to generate the final image 405 representing the top-down view.

The side view 208 represents a view from a side of the vehicle 100 (for example, a driver's side or a passenger's side), and includes a view of one of the wheels 116. In one embodiment, the side view 208 is generated via the processor 172 of FIG. 2 using images obtained from one or more cameras 103 disposed on or proximate one or more of the side mirrors 142 of the vehicle 100. Also in one embodiment, the side view mirror 142 is displayed based on whether the vehicle 100 is entering a turn, for example so that a user can later view whether the wheel 116 is hitting the apex of the turn while the vehicle 100 is making the turn.

While the components of the control system 102 (including the cameras 103, the sensor array 104, the controller 106, and the display unit 108) are depicted as being part of the same system, it will be appreciated that in certain embodiments these features may comprise two or more systems. In addition, in various embodiments the control system 102 may comprise all or part of, and/or may be coupled to, various other vehicle devices and systems, such as, among others, the actuator assembly 120, the electronic system 118, and/or one or more other systems of the vehicle 100.

Figure 3:
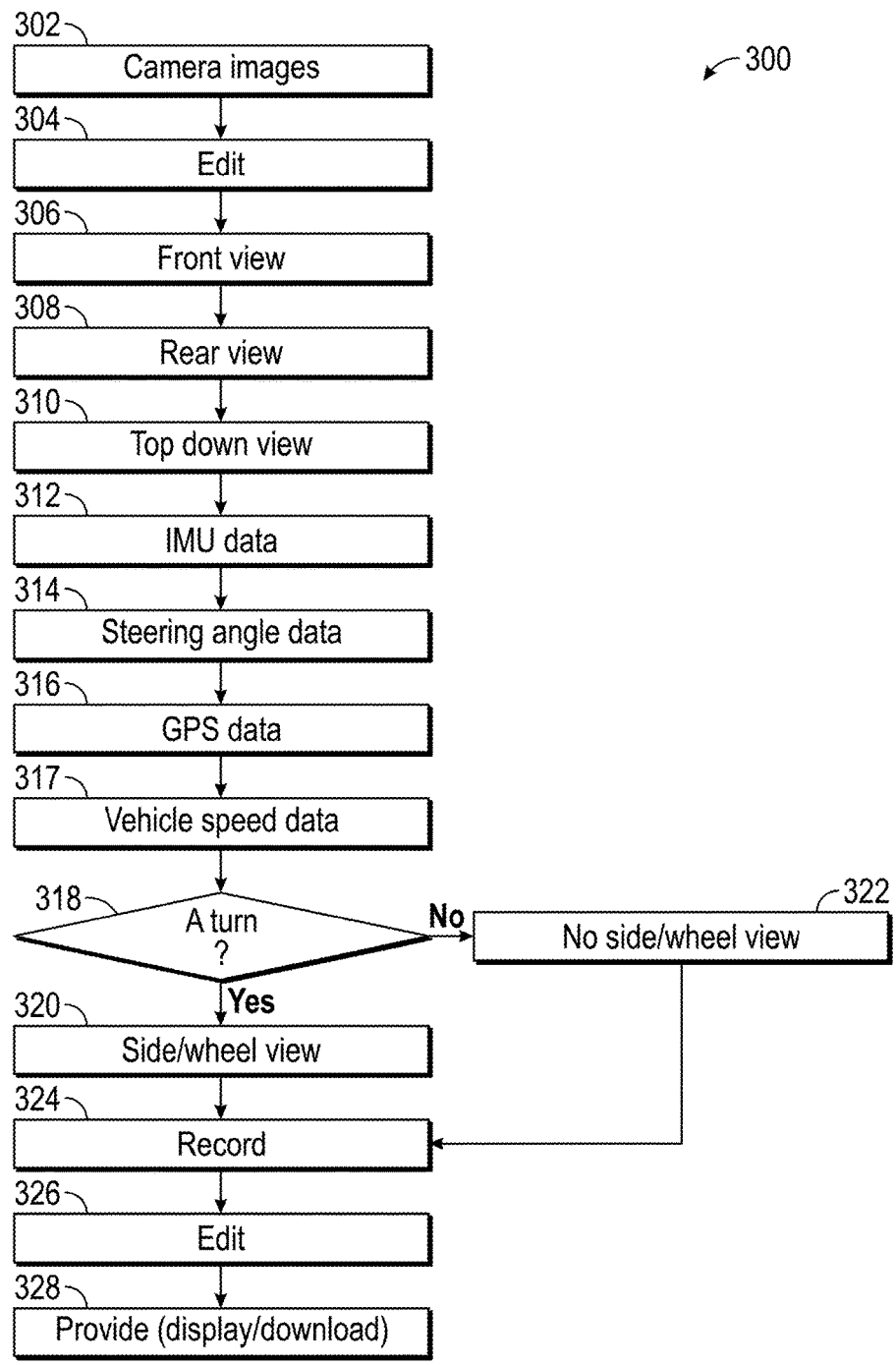
FIG. 3 is a flowchart of a process for providing vehicle data, and that can be used in connection with the vehicle of FIG. 1 and the display of FIG. 2, in accordance with an exemplary embodiment.
Figure 4:
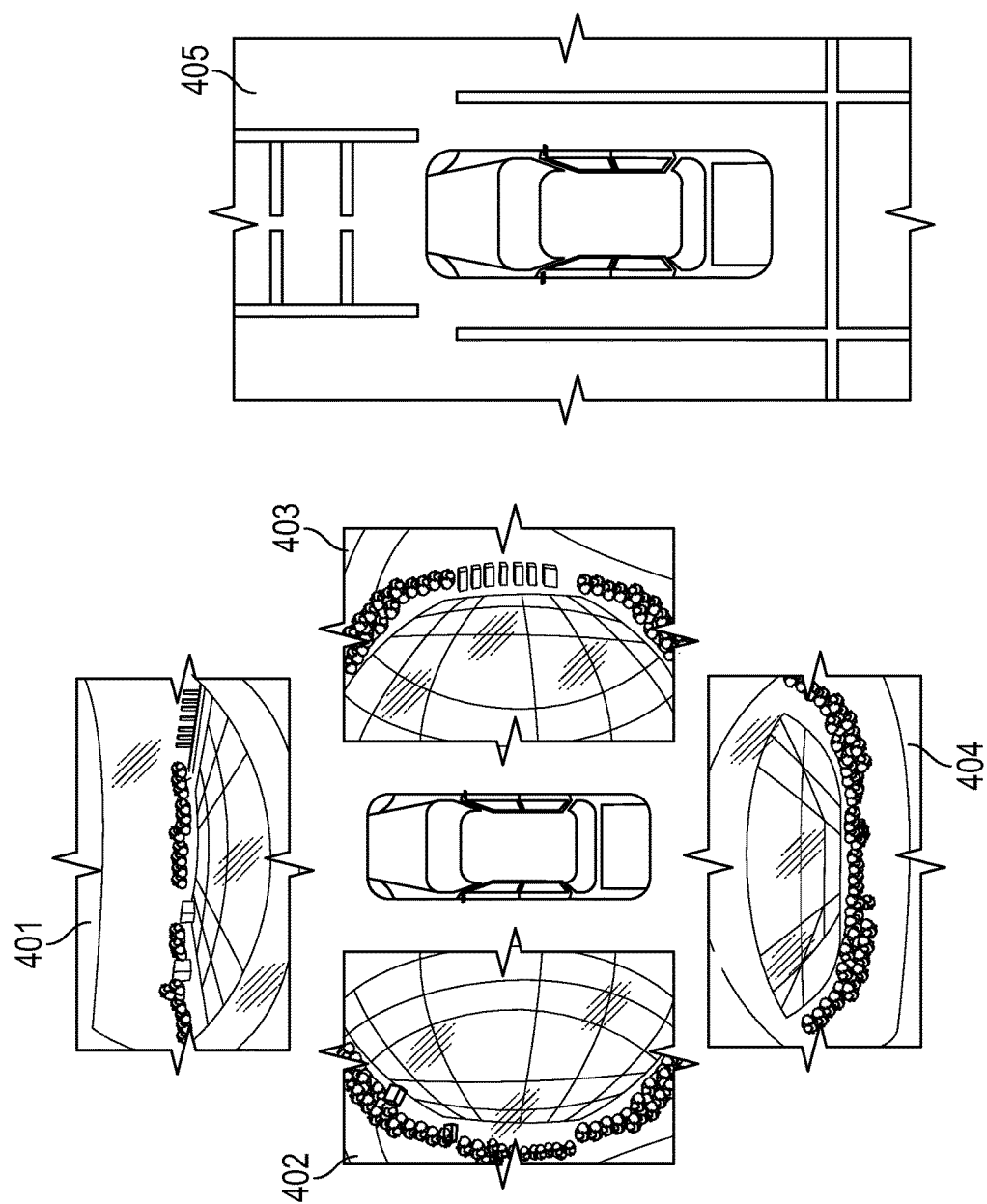
FIG. 4 is an illustration of how a top-down view is generated in accordance with the display of FIG. 2 and the process of FIG. 3, in accordance with an exemplary embodiment.

FIG. 3 is a flowchart of a process 300 for conducting vehicle diagnosis based on vehicle sounds. The process 300 can be implemented in connection with the vehicle 100 of FIG. 1, in accordance with an exemplary embodiment.

As depicted in FIG. 3, the process 300 includes the step of obtaining camera images (step 302). In one embodiment, during step 302, the processor 172 of FIG. 1 obtains images from each of the cameras 103 of FIG. 1. Also, in one embodiment, the obtained images include video images from various locations of the vehicle 100 of FIG. 1, such as from the front side view mirrors 142, the front grill 144, and the rear region (e.g. trunk) 146 of FIG. 1.

The images are edited (step 304). In one embodiment, video images from the cameras 103 of FIG. 1 obtained in step 302 are edited by the processor 172 of FIG. 1 during step 304. Also in one embodiment, the images are edited to produce different images corresponding to different views from different locations of the vehicle 100. In one embodiment, each of the images are edited and merged together to create the views shown on the display 200 of FIG. 2. In certain embodiments, the user (e.g. a driver of the vehicle 100) may have options to select the full views of display 200 and/or a subset of the display 200.

A front view is generated (step 306). In one embodiment, the processor 172 of FIG. 1 generates a front view using the images obtained from one or more cameras 103 disposed on or proximate the front grill 144 and/or rear view mirror 140 of FIG. 1. In one embodiment, the front view of step 306 corresponds to the front view 202 of FIG. 2, and represents a view directly in front of the vehicle 100. Also in one embodiment, the front view is generated continuously while the vehicle 100 is being driven.

A rear view is generated (step 308). In one embodiment, the processor 172 of FIG. 1 generates a rear view using the images obtained from one or more cameras 103 disposed on or proximate the rear region (e.g. trunk) 146 of FIG. 1. In one embodiment, the rear view of step 308 corresponds to the rear view 204 of FIG. 2, and represents a view directly behind the vehicle 100. Also in one embodiment, the rear view is generated continuously while the vehicle 100 is being driven.

A top down view is generated (step 310). In one embodiment, the processor 172 of FIG. 1 generates a top down view of the vehicle 100 using the images obtained from each of the cameras 103 of FIG. 1 (e.g. cameras 103 disposed on or proximate the front grill 144, rear region (e.g. trunk 146), and side mirrors 142. In one embodiment, the top down view of step 310 corresponds to the top down view 206 of FIG. 2, and represents a view from directly above (or on top of) the vehicle 100, facing downward. Also in one embodiment, the top down view is generated continuously while the vehicle 100 is being driven. In addition, in one embodiment, the images are edited to produce different images corresponding to different views from different locations of the vehicle 100, and each of the images are edited and merged together to create the top down view. Moreover, similar to the discussion above, in one embodiment the top down view is generated via the processor 172 of FIG. 2 using a compilation of images from each of the cameras 103 of the vehicle 100. Specifically, as discussed above, in one embodiment, raw images (e.g. video feed) from each wide field of view camera are sent to the processing unit (e.g. processor 172 of FIG. 1), which in turn de-warps each of the images, stitches all four images together, and creates the final top-down image. For example, with reference to FIG. 4, in one embodiment a front camera image 401 (from a camera at the front of the vehicle, such as proximate the rear view mirror 140 and/or front grille 144), a left camera image 402 (from a camera on a driver's side of the vehicle, such as on a driver's side mirror 142 of the vehicle), a right camera image 403 (from a camera on a passenger's side of the vehicle, such as on a passenger's side mirror 142 of the vehicle), and a rear camera image 404 (from a camera at the rear of the vehicle) are de-warped and stitched together to generate the final image 405 representing the top-down view.

Inertial measurement data is obtained (step 312). In one embodiment, inertial measurement data pertaining to movement of the vehicle 100 is generated by the inertial measurement unit 162 of FIG. 1 and provided to the processor 172 of FIG. 1 for processing for use in determining whether the vehicle 100 is making a turn.

Steering angle data is also obtained (step 314). In one embodiment, steering angle data pertaining to a steering angle of the steering wheel 151 of FIG. 1 is generated by the steering angle sensor 163 of FIG. 1 and provided to the processor 172 of FIG. 1 for processing for use in determining whether the vehicle 100 is making a turn.

In addition, in one embodiment, GPS position data is obtained (step 316). In one embodiment, data as to a position of the vehicle 100 is generated by the GPS device 164 of FIG. 1 and provided to the processor 172 of FIG. 1 for processing for use in determining whether the vehicle 100 is making a turn.

Also in one embodiment, vehicle speed data is obtained (step 317). In one embodiment, data as to a speed and/or velocity of the vehicle 100 is obtained and/or generated via one or more sensors and/or systems, such as one or more wheel speed sensors 165 and/or the GPS device 164 of FIG. 1 and provided to the processor 172 of FIG. 1 for processing for use in determining whether the vehicle 100 is making a turn.

A determination is made as to whether a vehicle is engaging in a turn (step 318). In one embodiment, during step 318 the vehicle 100 of FIG. 1 is determined to be engaged in a turn if the vehicle 100 is either currently performing a turn, beginning to perform a turn, or about to perform a turn. Also in various embodiments, this determination is made by the processor 172 based on information obtained by the sensor array 104 in steps 312, 314, 316, and/or 317. In one such embodiment, the determination of whether the vehicle 100 is engaging in a turn is made based on the inertial measurement data of step 312 (e.g. with respect to a change in lateral acceleration for the vehicle 100). In another embodiment, the determination of whether the vehicle 100 is engaging in a turn is made based on the steering angle data of step 314 (e.g. based on angular position and/or movement of the steering wheel 151 of FIG. 1). In yet another embodiment, the determination of whether the vehicle 100 is engaging in a turn is made based upon both the inertial measurement data of step 312 and the steering angle data of step 314 (e.g. based on both a change in lateral acceleration for the vehicle 100 and an angular position and/or movement of the steering wheel 151 of FIG. 1). In still another embodiment, the determination of whether the vehicle 100 is engaging in a turn is made based on the GPS position data of step 316 (e.g. with respect to whether the vehicle 100 is approaching a corner of a roadway or performance track in which a turn is likely). In another embodiment, the determination of whether the vehicle 100 is engaging in a turn is made based on the steering angle data of step 314 and the inertial measurement data of step 312 in combination with the vehicle speed data of step 317 (e.g. to determine when the vehicle 100 is slowing down for a turn). In another embodiment, the determination of whether the vehicle 100 is engaging in a turn is made based on the steering angle data of step 314, the inertial measurement data of step 312, and the GPS position data 316 in combination with the vehicle speed data of step 317 (e.g. to determine when the vehicle 100 is slowing down for a turn with potentially even greater precision).

If it is determined in step 318 that the vehicle is engaging in a turn (e.g. that the vehicle 100 of FIG. 1 is either currently performing a turn, beginning a turn, or about to perform a turn), then one or more side views are also generated (step 320). In one embodiment, the processor 172 of FIG. 1 generates the one or more side views using the images obtained from one or more cameras 103 disposed on one or more of the side mirrors 142 of FIG. 1. In one embodiment, the side view of step 320 corresponds to the side view 208 of FIG. 2. Also in one embodiment, the side view of step 320 represents a view from a side of the vehicle 100 (for example, a driver's side or a passenger's side), and includes a view of one of the wheels 116. In one such embodiment, a side view is generated for a driver side of the vehicle 100, and includes a front wheel 116 from the driver's side of the vehicle 100 (e.g. as depicted for front view 202 of FIG. 2). In another embodiment, a side view is generated for a passenger side of the vehicle 100, and includes a front wheel 116 from the passenger's side of the vehicle 100. In certain embodiments, side views are generated for both a driver side and a passenger side of the vehicle 100, and include a front wheel 116 from the driver's side of the vehicle 100 and a front wheel 116 from the passenger's side of the vehicle 100, respectively. In one embodiment, only the side of the vehicle 100 is shown corresponding to the direction in which the vehicle 100 is turning into (e.g. if the vehicle 100 is turning right, then the right side view using the right side camera, i.e., on the passenger's side of the vehicle 100, is shown). In addition, in one embodiment, whichever wheel(s) 116 of the vehicle 100 are depicted in the side view(s) of step 320, a depiction is provided for images of at least one of the wheels 116 throughout the turn so that a user can subsequently determine, upon review of a presentation of the images, whether or not the wheel 116 hit the apex during the turn (or, if the wheel 116 did not hit the apex, how close the wheel 116 came to the apex during the turn).

Conversely, in one embodiment, if it is determined in step 318 that the vehicle is not engaging in a turn, then a side view is not provided (step 322). In one embodiment, the side view images of step 320 are not generated via the processor 172 of FIG. 1 during step 322, when the vehicle 100 is not engaging in a turn. In another embodiment, the side view images of step 320 are not recorded during step 322, when the vehicle 100 is not engaging in a turn. In yet another embodiment, the side view images of step 320 are not edited by the processor 172 for presentation as part of the display and/or downloaded images for periods of time in which the vehicle 100 is not engaging in a turn. In one embodiment, when the vehicle 100 is not engaged in a turn, then the side view images are not included in the final presentation (e.g. the edited presentation or package that is subsequently provided for the user). In certain embodiments, the side views may still record in a separate file, for separate viewing if desired.

The images are recorded (step 324) and edited (step 326). In various embodiments, the recording and editing is directed and/or performed by the processor 172 of FIG. 1, and the resulting images (e.g. videos) are stored in the memory 174 of FIG. 1. In one embodiment, all streams of video images (e.g. from each of the cameras) are recorded separately, and in addition a composite feed corresponding to the display 200 of FIG. 2 is produced for the user and also stored in the memory 174.

In various embodiments, the images associated with the front view of step 306, the rear view of step 308, and the top down view of step 310 are recorded and edited via instructions provided by the processor 172 of FIG. 1 throughout the direction of time in which the vehicle 100 is being operated or driven (e.g. throughout a current ignition cycle for the vehicle 100).

Also in various embodiments, the side view(s) of step 320 are recorded and edited so that the side view(s) are presented along with the other views only for portions of the ignition cycle in which the vehicle 100 is engaging in a turn. For example, in one embodiment, whenever the vehicle 100 is engaging in a turn (as determined in step 318), each of the front, rear, top down, and side views of steps 306, 308, 310, and 320 are recorded/edited so that each of the four views 202, 204, 206, 208 of FIG. 2 will be presented from such time periods, for when the presentation is ultimately provided for the user (e.g. via viewing within the vehicle 100 and/or downloaded by the user). Also in one embodiment, whenever the vehicle 100 is not engaging in a turn, the front, rear, and top down views of steps 306, 308, and 310 are presented without the side view of step 320, so that views 202, 204, and 206 will be presented without view 208 of FIG. 2 from such time periods, for when the presentation is ultimately provided for the user (e.g. via viewing within the vehicle 100 and/or downloaded by the user).

In other embodiments (for example in which the user is primarily interested with evaluating the vehicle turns), the recording/editing is performed such that the presentation for the user will consist only of images/views from when the vehicle is making a turn. In one such embodiment, when the user ultimately views the presentation, all of the displayed images (e.g. video) will automatically be corresponding to time periods in which the vehicle 100 is engaging in a turn. Accordingly, when the user ultimately views the presentation, the user can easily focus in on the performance of the vehicle 100 (and/or of the driver thereof) for the time periods in which the vehicle 100 is engaging in a turn. In one such embodiment, one or more side views of step 320 are provided for such time periods, showing one or more of the wheels 116 of the vehicle 100, so that the user can readily determine whether the wheel 116 has hit the apex of the turn during the particular turns. Also in certain embodiments, the side view(s) of step 320 are depicted alongside other views, such as the front view, rear view, and/or top down views of steps 306, 308, and/or 310. In one such embodiment, the side view(s) of step 320 are depicted alongside each of the front view, rear view, and/or top down views of steps 306, 308, and/or 310, so that the total, composite display is similar to the display 200 depicted in FIG. 2 and described above in connection therewith.

The images are provided (step 328). In various embodiments, the images are provided as part of a presentation, such as one or more of the presentation types discussed above (e.g. in connection with step 326). In certain embodiments, the presentation is provided via the display screen 191 of the display unit 108 of FIG. 1 (e.g. as part of a rear view mirror 140 and/or infotainment unit inside the vehicle 100) for viewing inside the vehicle. In certain other embodiments, the presentation is provided for downloading by the user via the download device 192 of the display unit 108 of FIG. 1 (e.g. so that the user may subsequently view the presentation at the user's convenience, for example on the user's computer, smart phone, or the like). It will be appreciated that in other embodiments the presentation may be provided in one or more other manners, e.g. by electronic forwarding via e-mail, text message, and do so on.

In one embodiment, during the process 300 of FIG. 3, each of the images from each of the cameras (e.g. each of the views of the display 200 of FIG. 2) are recorded whenever the vehicle 100 is being driven, and are also used to generate composite images as set forth above. Also in one embodiment, the side views (e.g. corresponding to view 208 of the display 200 of FIG. 2) are displayed and/or included in the final presentation display only when the vehicle 100 is engaging in a turn (e.g. the right side view is displayed when the vehicle 100 is turning right, and the left side view is displayed when the vehicle 100 is turning left).

Accordingly, methods, systems, and vehicles are provided for providing vehicle images and data, for example for performance vehicles. In certain embodiments, a vehicle side view showing one or more wheels of the vehicle is provided based on whether the vehicle is engaging in a turn, for example for ready analysis as to whether the wheel has hit the apex of a turn. Also in certain embodiments, the vehicle side view is presented along with other vehicle views, including a front view, a rear view, and a top down view.

It will be appreciated that the disclosed methods, systems, and vehicles may vary from those depicted in the Figures and described herein. For example, the vehicle 100, the control system 102, and/or various components thereof may vary from that depicted in FIG. 1 and described in connection therewith. It will similarly be appreciated that the display 200 may differ from that depicted in FIG. 2. In addition, it will be appreciated that certain steps of the process 300 may vary from those depicted in FIG. 3 and/or described above in connection therewith. It will similarly be appreciated that certain steps of the methods described above may occur simultaneously or in a different order than that depicted in FIG. 3 and/or described above in connection therewith. It will similarly be illustrated that the techniques and displays of FIG. 4 may vary from that depicted in FIG. 4 and/or described in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof

What is claimed is:

1. A method comprising:
   determining whether a vehicle is engaging in a turn via a processor onboard the vehicle; and
   automatically recording a view of a wheel of the vehicle, from a camera onboard the vehicle, via instructions provided via the processor when it is determined that the vehicle is engaging in the turn, wherein the automatic recording of the view of the wheel is triggered by the vehicle's engagement of the turn as determined by the processor, via instructions provided via the processor onboard the vehicle to the camera onboard the vehicle to initiate the automatic recording via the camera when the vehicle is engaging in the turn, and wherein:
   the view of the wheel from the camera is automatically recorded in a computer memory onboard the vehicle, via instructions provided by the processor, when the vehicle is engaging in the turn, for subsequent display for a driver of the vehicle in analyzing the driver's driving; and
   the view of the wheel from the camera includes at least a side view of the vehicle showing the wheel of the vehicle throughout the turn, and including a view as to whether or not the wheel hit an apex of the turn during the turn;
   wherein the vehicle includes a plurality of cameras, and the method further comprises:
     providing instructions, via the processor, for the plurality of cameras to record, to the computer memory, a plurality of video images corresponding to a plurality of views of the vehicle, including the side view of the vehicle that includes the view of the wheel and whether the wheel has reached the apex of the turn while the vehicle is making the turn, wherein the plurality of cameras are instructed to continually record the plurality of video images for the plurality of views during operation of the vehicle, regardless of whether the vehicle is making a turn, in accordance with instructions provided by the processor; and
     processing the plurality of video images together to generate a video presentation, wherein the side view is included in the video presentation only for times in which the video was making a turn; and
   wherein the step of processing the plurality of video images together to generate the video presentation includes presenting an opposing side view for times in which the vehicle is making a turn in an opposing direction, such that:
     a right side view of the vehicle is included in the video presentation for times in which the vehicle is turning left, but not when the vehicle is turning right; and
     a left side view of the vehicle is included in the video presentation for times in which the vehicle is turning right, but not when the vehicle is turning left.

2. The method of claim 1, wherein:
the step of determining whether the vehicle is engaging in the turn comprises:
obtaining inertial measurements from an inertial measurement unit of the vehicle;
obtaining steering angle measurements from a steering angle sensor of the vehicle with respect to a steering wheel of the vehicle; and
determining whether the vehicle is engaging in the turn using the inertial measurements, the steering angle measurements, or both, via the processor onboard the vehicle; and
the step of automatically recording the view comprises automatically recording the view of the wheel, from the camera onboard the vehicle to the computer memory onboard the vehicle, via instructions provided via the processor when it is determined that the vehicle is engaging in the turn using the inertial measurements, the steering angle measurements, or both.

3. The method of claim 1, wherein:
the step of determining whether the vehicle is engaging in the turn comprises:
obtaining vehicle position data from a global positioning system (GPS) device; and
determining whether the vehicle is engaging in the turn using the vehicle position data from the GPS system; and
the step of automatically recording the view comprises automatically recording the view of the wheel, from the camera onboard the vehicle to the computer memory onboard the vehicle, via instructions provided via the processor when it is determined that the vehicle is engaging in the turn using the position data from the GPS system.

4. The method of claim 1, wherein the step of automatically recording a view comprises automatically recording video images of the wheel, from a video camera onboard the vehicle to the computer memory onboard the vehicle, via instructions provided via the processor when it is determined that the vehicle is engaging in the turn.

5. The method of claim 1, further comprising:
automatically providing, at the request of a user, edited video images of the wheel from each turn of the vehicle.

6. The method of claim 5, wherein the edited video images are provided via a display for viewing within the vehicle.

7. The method of claim 5, wherein the edited video images are provided via a download device for downloading by a user.

8. The method of claim 5, wherein the edited video images are provided alongside one or more additional images of the vehicle, wherein the one or more additional images of the vehicle are selected from the group consisting of: a top down view of the vehicle, a front view from a front of the vehicle, and a rear view from a rear of the vehicle.

9. A vehicle comprising:
a wheel;
a plurality of cameras disposed onboard the vehicle;
a computer memory disposed onboard the vehicle; and
a processor disposed onboard the vehicle, the processor configured to:
determine whether the vehicle is engaging in a turn; and
provide instructions for the plurality of cameras to automatically record, to the computer memory, a side view of the wheel showing whether or not the wheel hit an apex of the turn during the turn, for subsequent display for a driver of the vehicle in analyzing the driver's driving when it is determined that the vehicle is engaging in the turn, wherein the automatic recording of the side view of the wheel is triggered by the vehicle's engagement of the turn as determined by the processor, via the instructions provided via the processor onboard the vehicle to the plurality of cameras onboard the vehicle to initiate the automatic recording via the cameras when the vehicle is engaging in the turn;
wherein the processor is configured to:
provide instructions for the plurality of cameras to record, to the computer memory, a plurality of video images corresponding to a plurality of views of the vehicle, including the side view of the vehicle that includes the view of the wheel and whether the wheel has reached the apex of the turn while the vehicle is making the turn, wherein the plurality of cameras are instructed to continually record the plurality of video images for the plurality of views during operation of the vehicle, regardless of whether the vehicle is making a turn, in accordance with instructions provided by the processor; and
process the plurality of video images together to generate a video presentation, wherein the side view is included in the video presentation only for times in which the video was making a turn; and
wherein the processor is configured to process the plurality of video images together to generate the video presentation that presents an opposing side view for times in which the vehicle is making a turn in an opposing direction, such that:
a right side view of the vehicle is included in the video presentation for times in which the vehicle is turning left, but not when the vehicle is turning right and
a left side view of the vehicle is included in the video presentation for times in which the vehicle is turning right, but not when the vehicle is turning left.

10. The vehicle of claim 9, further comprising:
an inertial measurement disposed onboard the vehicle, the inertial measurement unit configured to generate inertial measurements pertaining to the vehicle;
a steering wheel; and
a steering angle sensor coupled to the steering angle sensor and configured to obtain steering angle measurements with respect to the steering angle;
wherein the processor is coupled to the inertial measurement unit, and is configured to at:
determine whether the vehicle is engaging in the turn using the inertial measurements, the steering angle measurements, or both; and
provide instructions for the plurality of cameras to automatically record, to the computer memory, the side view of one of the wheels when it is determined that the vehicle is engaging in the turn using the inertial measurements, the steering angle measurements, or both.

11. The vehicle of claim 9, further comprising:
a global positioning system (GPS) device disposed onboard the vehicle and configured to generate position data for the vehicle;
wherein the processor is coupled to the GPS device, and is configured to:
determine whether the vehicle is engaging in the turn using the position data from the GPS device; and provide instructions for the plurality of cameras to automatically record a view of one of the wheels when it is determined that the vehicle is engaging in the turn using the position data from the GPS device.

12. The vehicle of claim 9, wherein the processor is configured to automatically provide, at the request of a user, edited video images of the wheel from each turn of the vehicle.

13. The vehicle of claim 12, wherein the edited video images are provided via a display screen within the vehicle, via instructions provided via the processor, for viewing within the vehicle or for downloading by a user of the vehicle.

* * * * *